United States Patent [19]

Riccitiello et al.

[11] Patent Number: 5,223,461

[45] Date of Patent: Jun. 29, 1993

[54] CERAMIC SILICON-BORON-CARBON FIBERS FROM ORGANIC SILICON-BORON-POLYMERS

[75] Inventors: Salvatore R. Riccitiello; Ming-ta S. Hsu; Timothy S. Chen, all of San Jose, Calif.

[73] Assignee: The United States of America as represented by the Administrator of the National Aeronautics and Space Administration, Washington, D.C.

[21] Appl. No.: 880,856

[22] Filed: May 11, 1992

Related U.S. Application Data

[60] Continuation-in-part of Ser. No. 643,629, Jan. 18, 1991, Pat. No. 5,130,278, which is a division of Ser. No. 361,471, Jun. 5, 1989, Pat. No. 4,987,201.

[51] Int. Cl.$^5$ .............................................. C04B 35/52
[52] U.S. Cl. ...................................... 501/95; 501/90; 501/92; 264/DIG. 19
[58] Field of Search .................... 501/90, 92, 95, 96; 264/DIG. 19; 528/4, 5, 7; 556/402, 403

[56] References Cited

U.S. PATENT DOCUMENTS

| | | | |
|---|---|---|---|
| 3,853,567 | 12/1974 | Verbeek | 501/92 |
| 3,892,583 | 7/1975 | Winter et al. | 501/92 |
| 4,052,430 | 10/1977 | Yajima et la. | 260/448.2 D |
| 4,550,151 | 10/1977 | Takamizawa | 528/7 |
| 4,604,367 | 8/1985 | Takamizawa et al. | 501/88 |
| 4,767,728 | 8/1988 | Riccitiello | 501/91 |
| 4,851,491 | 7/1989 | Riccitiello | 528/4 |
| 4,942,011 | 7/1990 | Bolt | 264/29.2 |
| 4,987,201 | 1/1991 | Riccitiello | 528/4 |

OTHER PUBLICATIONS

K. J. Wynne et al "Ceramics via Polymer Pyrolysis" *Ann. Rev. Mat. Sci.*, vol. 14, (1984), pp. 297-334.

W. Toreki, "Polymeric Precursor to Ceramics-A Review", *Polymer News*, vol. 16 (#1):6 pp. 6 to 14 (1991).

L. Maya, "Aminoborane Polymers as Precursors of C-N-B Ceramic Materials":, *J. Am. Ceram. Soc.*, vol. 71 (#12): p. 1104 (1988).

M. Zeldin et al., (ed.), *Inorganic and Organomet*, ACS Symposium, Series 360, Wash. D.C. 1988, Table of Contents.

M-T. S. Hsu et al. "Preceramic organoboron-Silicon Polymers", *J. Applied Polymer Sci.*, vol. 42 (1991). pp. 851-861.

G. E. Legros et al., "Ceramics form Hydridoplysilazane", *Am. Ceram. Soc. Bull.*, vol. 66 (1987), pp. 363-367.

B. G. Penn et al. "Preparation of Silicon Carbide and Silicon Nitride Fibers by the Controlled Pyrolysis of Polycarbosilazanes", *J. Applied Polymer Sci.*, vol. 27 (1982), p. 3751.

*Primary Examiner*—Mark L. Bell
*Assistant Examiner*—Anthony J. Green
*Attorney, Agent, or Firm*—Darrell G. Brekke; Guy Miller; John R. Manning

[57] ABSTRACT

The present invention concerns novel high strength ceramic fibers derived from boron, silicon, and carbon organic precursor polymers. The ceramic fibers are thermally stable at and above 1200° C. in air. The method for preparation of the boron-silicon-carbon fibers from a low oxygen content organosilicon boron precursor polymers of the general formula $Si(R_2)BR^1$ by melt-spinning, crosslinking and pyrolysis. Specifically, the crosslinked (or cured) precursor organic polymer fibers do not melt or deform during pyrolysis to form the silicon-boron-carbon ceramic fiber. These novel silicon-boron-carbon ceramic fibers are useful in high temperature applications because they retain tensile and other properties up to 1200° C., from 1200° to 1300° C., and in some cases higher than 1300° C.

23 Claims, 2 Drawing Sheets

CERAMIC SILICON-BORON-CARBON FIBERS FROM ORGANIC SILICON-BORON-POLYMERS

The invention disclosed herein was made in the performance of work under a NASA contract and is subject to Public Law 96-517 (35 U.S.C. § 200 et sec.). The contractor has not elected to retain title in this invention.

RELATED APPLICATIONS

This application is a continuation-in-part of U.S. Ser. No. 643,629, filed Jan. 18, 1991, now U.S. Pat. No. 5,130,278 which is a divisional application of U.S. Ser. No. 361,471, filed Jun. 5, 1989, now U.S. Pat. No. 4,987,201, issued Jan. 22, 1991. These applications are specifically incorporated herein by reference in their entirety.

FIELD OF THE INVENTION

This invention concerns novel boron, silicon, and carbon high strength ceramic fibers, derived from silicon, boron, carbon precursor polymers, and particularly includes the method for preparation, curing of the boron silicon carbon precursor polymer as a green fiber, and pyrolysis to the ceramic fiber. After pyrolysis, the novel silicon-boron-carbon ceramic fibers are thermally stable at and above 1200° C. in air. The invention relates to a low oxygen content organosilicon polymer of the general formula $Si(R_2) BR^1$ used as precursors for the preparation of the silicon-boron-carbon ceramic fibers by melt-spinning, crosslinking and pyrolyzation.

BACKGROUND ART AND RELATED DISCLOSURES

Non-oxide ceramic products such as silicon carbide, silicon nitride, silicon boride, and/or boron nitride possess many desirable properties, such as a high thermal stability, a high oxidative stability, a high degree of hardness, and a wide range of electronic properties.

These ceramic products can be prepared by the pyrolysis of a suitable polymer precursor, according to methods described, for example, in *Ann. Rev. Mater. Sci.*, 14:297 (1984); *Polymer News*, 16:6 (1991); *J. Am. Ceram. Soc.*, 71:1104 (1988) and *Inorganic and Organomet.*, ACS Symposium, Series 360, Washington, D.C. (1988). Silicon carbide ceramic fibers and various modifications thereof produced by the polymer-pyrolysis route have been disclosed in U.S. Pat. Nos. 4,052,430 and 4,604,367. These ceramic fibers, known as Nicalon silicon carbide materials, however, usually contain 11–13% of oxygen which is introduced during the curing process, causing the Nicalon silicon carbide ceramic fibers to have the lower tensile properties at or above 1100° C. The low tensile properties of these ceramic fibers are presumably due to the presence of silicon oxides in the fibers, and the silicon-carbon grain size grown at high temperatures.

U.S. Pat. No. 4,604,367 discloses an inorganic fiber composed of silicon, carbon, boron, and nitrogen comprising a four-step process for the production of organoborosilicon precursor fibers. (A) In the first step, the constituent components are heated to produce 2 meltable polymer. (B) In the second step, the compound is spun into a precursor fiber. (C) In the third step, the precursor fiber is cured in an oxidizing atmosphere. The curing (or further) processing can also be achieved by gamma ray and/or e-beam irradiation in a vacuum or in an inert gas and by oxidation. (D) In the fourth step, the cured precursor fiber is calcinated by heating in the range of 900° C. to 1800° C. The resulting ceramic fiber is more stable at high temperatures.

U.S. Pat. No. 4,550,151 discloses another organoborosilicon nitrogen-containing fiber and method or its production. U.S. Pat. No. 4,942,011 relates to a silicon carbide fiber having a higher density. The patent also discloses a means for production of a ceramic fiber using a sintering process in an inert or reducing atmosphere at the temperature range of 1800° C. to 2200° C. in the presence of 0.2–5% of boron carbide as sintering aid.

U.S. Pat. No. 4,987,201 describes the preparation of an organo-metallic polymer comprising boron-carbon-silicon produced by pyrolysis of an inorganic Si-B-C material. Similar inorganic silicon-boron-carbon material is also discussed by M.-T. S. Hsu et al. in the *Journal of Applied Polymer Science*, Vol. 42, pp. 851–861, published in 1991. U.S. Pat. Nos. 4,767,728 and 4,851,491 also relate to the production of organoborosilicon polymers. Polymers of the silicon-boron carbon systems described in the 4,851,491 and 4,767,728 patents can be used as new ceramic precursors of the present invention.

Silicon nitride and polymeric precursors were reported in *Am. Ceram. Soc. Bull.*, 66:363 (1987) to yield high tensile strength fibers upon pyrolysis. Further, the pyrolysis of silicon carbide polymers can produce ceramic fibers with engineering scale properties.

All references and patents cited herein are incorporated by reference in their entirety. However, none teach or suggest the present invention.

It is often desirable to obtain a ceramic in a particular final shape or form, e.g. a fiber. Often the precursor organic fiber is formed and then pyrolyzed directly to form the ceramic fiber. When the precursor polymer is pyrolyzed directly, the organic fiber melts and deforms during pyrolysis. Thus, the final ceramic fiber shape does not have the desired shape.

The current invention obviates many of the disadvantages connected with above cited patents. Namely, it provides a process to produce high strength silicon-boron-carbon ceramic fibers which are more stable at high temperatures than conventional silicon carbide fibers and silicon nitride fibers. The novel process also includes a curing (or crosslinking) step B of the precursor polymer so that it does not melt or deform during the subsequent pyrolysis.

SUMMARY

The present invention relates to a process for producing the novel ceramic fibers from silicon-boron-carbon precursor polymers by melt-spinning the precursor polymer into a fibrous green form, by crosslinking the polymer precursor fiber using thermal oxidation or UV irradiation/air, hydrazine/UV, or a combination thereof, and followed by pyrolysis of the crosslinked polymer precursor fiber.

One aspect of the current invention relates to novel ceramic silicon-boron-carbon fibers produced from silicon-boron-organic precursor polymers wherein the ceramic fibers have a high tensile strength and stability at and above a temperature of 1200° C.

The current invention also relates to silicon-boron-carbon ceramic fibers prepared by pyrolysis of low oxygen content organic silicon-boron precursor polymer systems having the general formula:

wherein

R is hydrogen, lower alkyl, dimethyl silicon or silicon boron;

$R_1$ is hydrogen, methyl, dimethyl silicon or silicon boron;

n is greater than or equal to 1; and m is greater than or equal to 1.

The present invention also relates to a cured organic precursor polymer fiber which retains its shape and does not melt or deform during the pyrolysis step.

Still another aspect of this invention relates to curing of the just-spun green precursor polymer fiber by thermal/air curing accelerated by UV irradiation.

One aspect of the current invention concerns curing of the just spun green fibers with a hydrazine cure in combination with UV radiation.

BRIEF DESCRIPTION OF THE INVENTION AND PREFERRED EMBODIMENTS

Definitions

As used herein:

"Alkyl" refers to linear, branched, cyclic or combinations thereof of saturated carbon-hydrogen groups having 1 to 20 carbon atoms.

"Aliphatic solvent" refers to linear, branched, cyclic or a combination thereof of saturated organic compounds having from 5 to 20 carbon atoms.

"Aromatic solvent" refers to benzene, toluene, xylene, naphthalene or combinations thereof.

"Halogen" refers to chloro, bromo or iodo.

"Lower alkyl" refers to linear, branched, cyclic or a combination thereof of saturated carbon-hydrogen containing groups having from 1 to 6 carbon atoms.

This invention describes new high strength high thermal oxidatively stable ceramic fibers derived from silicon, boron, and carbon-containing polymer precursors. More specifically, the invention pertains to an improved three step process for production of silicon-boron-carbon (and optionally nitrogen ceramic fiber. The resulting ceramic fibers have a superior tensile strength and thermal stability at temperatures exceeding 1200° C.

Boron-silicon-carbon fibers are prepared from low oxygen-content organoborosilicon polymers of the general formula —Si($R_2$)—B$R^1$— by a three step method. First, the organoborosilicon polymer precursors are melt-spun into a fibrous form. Second, the resulting polymer precursor fiber is crosslinked either by UV irradiation at 2537 Å in air, or by thermal oxidation in a temperature range of 25°-150° C. or by hydrazine exposure followed by UV radiation. Third, the resulting crosslinked fiber is pyrolyzed at 800°-1400° C. in an inert atmosphere.

Precursors

The organosilicon polymers disclosed in U.S. Pat. Nos. 4,987,201, 4,767,728 or 4,851,491 are advantageously used as starting materials for the preparation of silicon-boron-carbon ceramic fibers.

In one embodiment, the organic precursor polymer is a polyorganoborosilane obtained by:

(a) combining an organoborohalide of the formula $R^4$—B—$(X^1)_2$ and an organohalosilane of the formula $R^2R^3Si(X^2)_2$ with or without $R^5X^3$ present wherein $R^4$ is selected from halogen, lower alkyl, vinyl, cycloalkyl, or phenyl;

$R^5$ is lower alkyl, vinyl, cycloalkyl or phenyl;

$R^2$ and $R^3$ are each independently selected from hydrogen, lower alkyl, vinyl, cycloalkyl, aryl, or substituted aryl; and $X^1$, $X^2$ and $X^3$ are each independently selected from chloro, bromo, or iodo, in an anhydrous aprotic solvent having a boiling point at ambient pressure of not greater than 160° C., with at least four equivalents of an alkali metal;

(b) heating the reaction mixture for a time and at a temperature up to about 160° C. effective to produce a polyorganoborosilane; and (c) recovering the polyorganoborosilane produced in step (b) which consists essentially of a plurality of repeating units of the formula:

(A)

the polymer unit being linked together by second units of the formula:

(D)

wherein $R^1$ is hydrogen is lower alkyl, vinyl, cycloalkyl, phenyl, or (E)

wherein R² and R³ are each independently selected from hydrogen, halogen, lower alkyl, vinyl, cyclo- 4,767,728, which is specifically incorporated by reference.

REACTION SCHEME 1

Silicon + Boron Halide Compound $\xrightarrow[\text{Dry } (\pm \text{ MeI}]{\text{Na/Octane}}$ $-(\text{Si})_n-(\text{B})_m-$ wherein polymers I–IV are prepared by reaction of following compounds:

| POLYMER | SILICON HALIDE | BORON COMPOUND | METHYL IODIDE | SOLVENT | OTHER |
|---|---|---|---|---|---|
| I. | Dimethyl Dichlorosilane (DDS) | Boron Trichloride | No | Na/K xylene or octane | |
| II. | (DDS) | Methyl Dibromide | No | Na/Xylene or octane | |
| III. | (DDS) | Methyl Trichloride | Yes | Na/Xylene or octane | |
| IV. | (DDS) | Boron Trichloride | Yes | Na/Octane | Vinylmethyl Dichlorosilane | alkyl, or phenyl; r is an integer between 1 and 100; p is an integer between 1 and 100; and q is an integer between 1 and 100 wherein the polymer has a linear block, linear alternating, linear random structure or a random three dimensional structure.

The polyorganoborosilane ceramic precursor polymer obtained consists essentially of a plurality of repeating units of the formula:

(A)

the polymer unit being linked together by second units of the formula:

(D)

wherein R¹ is hydrogen, lower alkyl, vinyl, cycloalkyl, phenyl, or (E)

wherein R² and R³ are each independently selected from hydrogen, halogen, lower alkyl, vinyl, cycloalkyl, or phenyl; r is an integer between 1 and 100; p is an integer between 1 and 100; and q is an integer between 1 and 100, wherein the precursor polymer has a linear block, linear alternating, linear random structure, or a random three dimensional structure.

This precursor preparation is also described below as a basis for the present invention. Typically, low oxygen-content silicon polymer precursors are prepared by methods based on the sodium coupling reaction of boron and silicon halides synthesized in dry octane according to the Reaction Scheme 1, see U.S. Pat. No.

The resulting organic precursor polymers had the general formulas:

Polymer I: $[\text{Si}]_n$ Me$_2$—$[\text{B}]_m$ SiMe$_2$ wherein n and m are $\geq 1$;

Polymer II: $[\text{Si}]_n$ Me$_2$—$[\text{B}]_m$—CH$_3$ wherein n and m are $\geq 1$;

Polymer III: $[\text{Si}]_n$ Me$_2$—$[\text{B}]_m$—CH$_3$ wherein n and m are $\geq 1$; and Polymer IV: $[\text{Si}]_{0.9n}$ Me$_2$—$[\text{Si}]_{0.1n}$ Me(CH$_2$CH$_3$)—$[\text{B}]_m$Me, where R is Me or H, R$_1$ is Si(Me)$_2$, H or Me and wherein n is equal to m or n is 2 m, wherein "Me" in the above formulas represents "methyl".

Reaction Scheme 1 illustrates, in general, a method for preparation of organoborosilicon precursor polymers I–IV. The reaction is described by reaction of boron trichloride and dimethyldichlorosilane (Polymer I), or by reaction of methyl boron dibromide and dimethyldichlorosilane (Polymer II), or by reaction of boron trichloride, methyl iodide and dimethyldichlorosilane (Polymer III), or by reaction of boron trichloride, methyl iodide, vinyl methyl dichlorosilane and dimethyldichlorosilane (Polymer IV). Each of these reactions result in a different polymer having a general formula as shown above. In some reactions, methyl iodide is preferred.

The synthesis and isolation of the polymers I–IV were conducted in a dry and inert atmosphere because the starting materials and the organic silicon-boron-carbon precursor polymers are sensitive to air.

Typically, sodium or potassium are mixed in a flask with an anhydrous aliphatic or aromatic hydrocarbon solvent, such as dry xylene or octane, and stirred under inert gas, e.g. nitrogen or argon atmosphere and for about 30 minutes to about 4 hours, preferably about 1 hour. Slight positive gas pressure is maintained during the synthesis of the precursor polymers. The flask is heated to 100°–150° C., preferably to about 125°–138° C. and silane halide, preferably dimethyldichloro-silane or vinyl methyl dichlorosilane and boron compound, such as boron trichloride or methyl boron dibromide, and optionally methyl iodide, are slowly added dropwise at 1–3 drops/sec. at temperatures between 110°–145° C. The reaction mixture is refluxed for 1–3 days, preferably for about 1 day. Then the reaction mixture is cooled, filtered and the solvent is distilled off and the resulting organic precursor polymer is collected.

The synthesis of polymers I-IV is described in Preparations 1-4 below.

The preparation of silicon-boron-carbon precursor organic fibers, the curing step, pyrolysis step, and the silicon-boron-carbon ceramic fibers are illustrated in Reaction Scheme 2.

REACTION SCHEME FOR Si—C—B—O or Si—C—B—N CERAMIC FIBER
Scheme 2 where R is as defined herein, preferably H or Me wherein
R is independently selected from hydrogen, lower alkyl, dimethyl silicon or silicon boron;
$R^1$ is independently selected from hydrogen, lower alkyl, dimethyl silicon or silicon boron;
n is $\geq 1$; and
m is $\geq 1$.

The subscripts m and n are each independently up to about 100, preferably to about 10.

The preparation of silicon-boron-carbon ceramic fiber begins with synthesis of precursor polymers I-IV by reaction of silicon halide dimethyldichlorosilane with boron compound (boron trichloride), in the presence of solvent, as described above, which reaction results in low oxygen content organoborosilicon polymer. On the other hand, to obtain the silicon-boron-carbon ceramic fiber (A) specifically containing a small amount of oxygen, organic precursor polymer is submitted first to melt-spinning of the precursor polymer into a fibrous form (Step 1) and subsequently to a cure which crosslinks the precursor fiber, e.g. by UV irradiation in air, or thermal oxidation in the presence of oxygen (Step 2A). This step results in cured oxygen-containing precursor polymer fibers (IV) from polymer I to IV, or cured by hydrazine-UV radiation. These cured precursor fibers (Step 2B) are then submitted to pyrolysis resulting in black ceramic fibers, which contains less oxygen than fiber A.

Melt-Spinning

Step 1 begins with the melt-spinning the polymers into a fibrous form. Generally, to remove any particles prior to drying, the polymer melts are filtered through a 5 to 20 µm filter screen followed by melt spin. The melt-spinning process is accomplished by using a conventional extrusion fiber spinning device (e.g. Alex James) through a spinnerette of 0.1-1 mm holes which yields monofilament continuous green uncured fibers having between about 10-60 µm in diameter.

Different diameters of polymer are extruded at temperatures of 80°-200° C. which temperatures are 30°-80° C. above the softening or melting point of the precursor polymer, as determined by Thermal Mechanical Analysis (TMA). The polymer is then spun on to a spool at a rate of 12 to 300 meters per minute. Precursor fibers having diameters of 10-60 µm were drawn successfully by using this procedure.

Curing of Green precursor Polymer

Just spun-monofilament green precursor fibers are cured by several procedures to yield a cross-linked precursor fiber. Spun green boron containing precursor fiber is cured in air at temperatures in the range of 25°-150° C. The cure process in air is a slow process, as the thin green fibers must be cured by oxidizing the fiber at room temperature for 3 to 4 days followed by gradual heating from room temperature to 100°-150° C. at a heating rate of about 0.1-10° C. per min and holding this process temperature for one or more days. The level of oxygen incorporated is about 5 to 25% by weight.

A better and faster oxidation curing method is to irradiate the polymer fiber with UV light (2537 Å) in air. In the UV oxidation process, the just-spun precursor polymer fiber is irradiated with UV light (<3000 Å) in the presence of air for 1 to 48 hours. UV radiation alone does not completely cure the polymers in the absence of air.

Thermogravimetric analysis (TGA) curves of the precursor polymer after the thermal oxidation cure show that there is only slight decomposition of the material at 300°-100° C., equal to approximately 18-19% The TGA for UV/air cured material is similar to the one obtained for a fiber cured by thermal oxidation.

An alternative way of curing green precursor fibers in the absence of oxygen is a hydrazine cure (Step 2B), where the green fibers are exposed to hydrazine vapors under an inert (generally oxygen and moisture free) conditions, preferably under nitrogen or argon atmosphere for 1-48 hours, preferably for 16 hours and then irradiated with UV (2537 Å) for 3-48 hours, preferably for 6-16 hours.

Both the thermal/air and hydrazine cure are advantageously accelerated by UV radiation (2537 Å).

If the organic precursor polymer is not cured, then the organic precursor polymer as a fiber will melt and deform during the pyrolysis. Thus, the present process is useful to produce ceramic fibers having useful predetermined diameters and length.

Pyrolysis of the Cured Precursor Polymer

The next step 3 illustrated in the Reaction Scheme 2 is the pyrolysis of the crosslinked precursor fiber at 800°–1400° C. in an inert atmosphere. The UV air-cured precursor polymer fibers are pyrolyzed to obtain black silicon-boron-carbon fiber. The pyrolysis is performed in an inert atmosphere at a heating rate of about 0.1°–100° C. per min, to about 1300° C., followed by 5 min to two hours at 1300° C.

Typically, the oxidized fibers are pyrolyzed in an argon or nitrogen atmosphere by heating them from ambient temperature to up to 1300° C. at a rate of heating about 0.1°–100° C. per minute. The fibers are then held at about 1000°–1300° C. for about 15–60 minutes.

The black ceramic fibers were evaluated for tensile properties at room temperature and at 1200° and at 1300° C. The tensile strengths at room temperature of the silicon-boron-carbon-oxygen ceramic fibers are in the 50–260 ksi range depending on the diameter. The tensile strength of the ceramic fibers at elevated temperature around 1200° C. was found to be equal or slightly higher than the tensile strength measured at room temperature.

Figure 1:
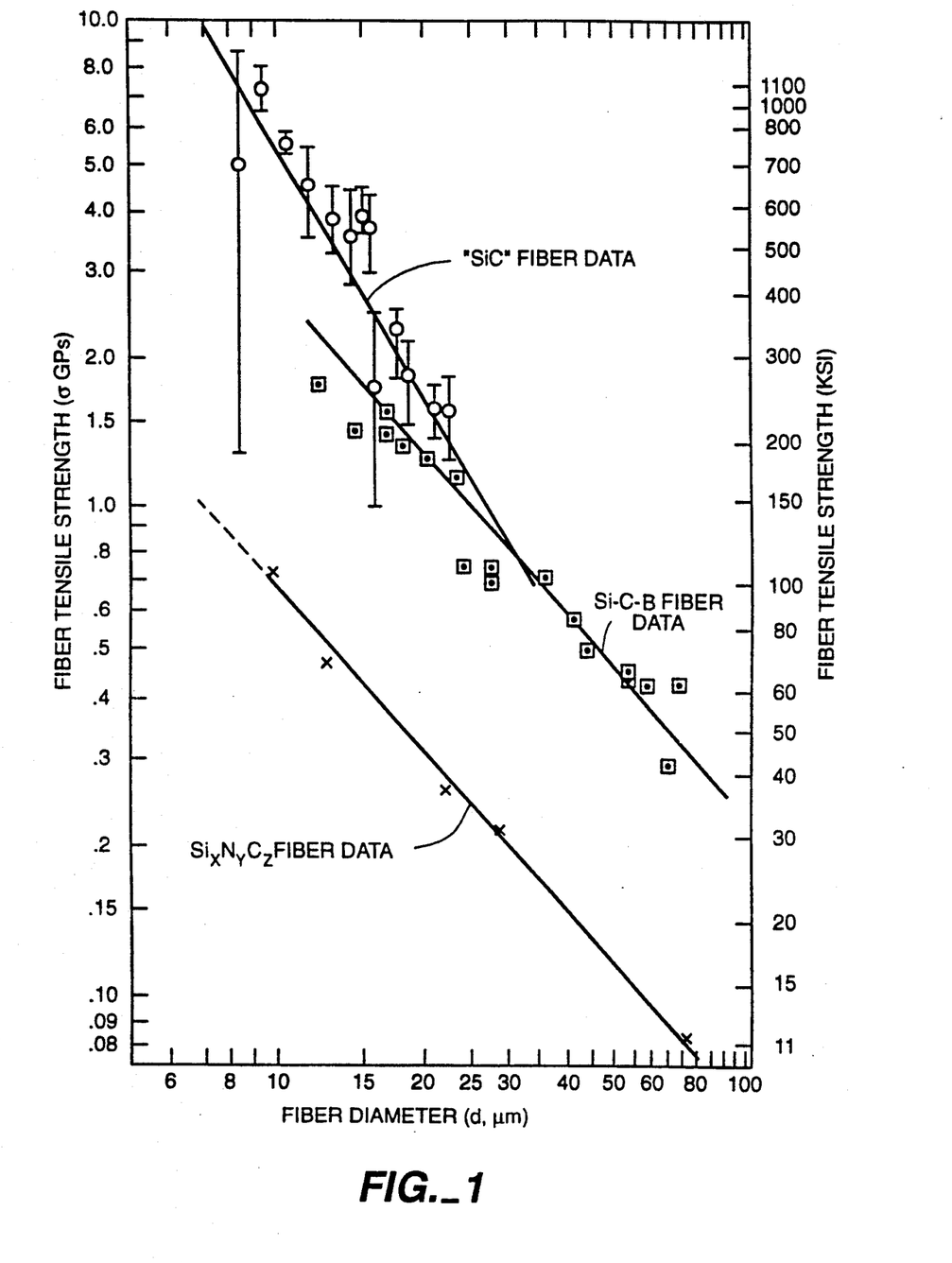
FIG. 1 depicts the tensile strength of the new ceramic fiber as a function of fiber diameter compared to the tensile strength of Nicalon and silicon-nitrogen-carbon fibers. Nicalon is silicon carbide (with some oxygen) commercially available from Nippon Chemical, Tokyo, Japan. See S. Yajima et al., U.S. Pat. No. 4,052,430. The silicon-carbon-nitrogen fiber is described in U.S. Pat. No. 3,853,567 and 3,892,583 and in Penn et al., *J. Applied Polymer Science*, Vol. 27, p. 3751 (1982). Also, see K. J. Wynne et al., *Annual Reviews in Materials Science*, Vol. 14, p. 297-334 (1984).

Results are illustrated in Table 1 and in FIG. 1. Tensile strength depends upon the diameter of the fiber.

Table 1 below illustrates the tensile properties of 1 inch or 7 inch long ceramic fiber at ambient or at elevated temperature. As seen from the results, the tensile strength depends on both the diameter and length of the fiber. However, there were no significant differences between room temperature and 1200° or 1300° C. Thus, for example, samples 3, 4 and 5, having exactly the same diameter 10–13 μm and length, both have a tensile strength of about 140 thousand pounds per square inch (KSI or ksi) and tensile modules around 25 million pounds per square inch (MSI or msi).

Table 1 illustrates tensile properties of silicon-boron-carbon ceramic fibers at ambient and at high temperature.

TABLE 1

| Sample No./Description | Diameter (μm) | Tensile Strength (ksi) | Tensile Modulus (msi) |
|---|---|---|---|
| 1/1"RT (Polymer I) | 17–20 | 204 (232)* | 27 |
| 2/1"RT | 10–13 | 158 (194)* | 25 |
| 3/7"RT | 10–13 | 110 | 23 |
| 4/7", 1200° C. | 10–13 | 145 | 26 |
| 5/7", 1300° C. | 10–13 | 136 | 25 |
| 6/B270-1", RT | 10–18 | 207 (264)* | 34 |

RT-room temperature
UV-air cured sample pyrolyzed at 1100 or 1300° C. in argon.
Tensile Strength is the average tensile strength of 5 or more samples.
*Best tensile strength.

FIG. 1 demonstrates that ceramic fiber strength is related to fiber diameter. Thus, FIG. 1 summarizes results obtained by comparing tensile strength of silicon carbon fiber (Nicalon) (—o—), silicon-carbon-nitrogen fiber (—X—) as described in Ann. Rev. Mater. Sci., 14:297 (1984) and silicon-boron-carbon (—□—) of the current invention as a function of the fiber diameter. As seen from the data, Nicalon fiber (—O—) has higher tensile strength at a diameter of 8 microns as compared to a fiber having a diameter of 40 microns. Silicon-nitrogen-carbon (—X—) has only about 100 KSI tensile strength when the fiber diameter is around 10.

Figure 2:
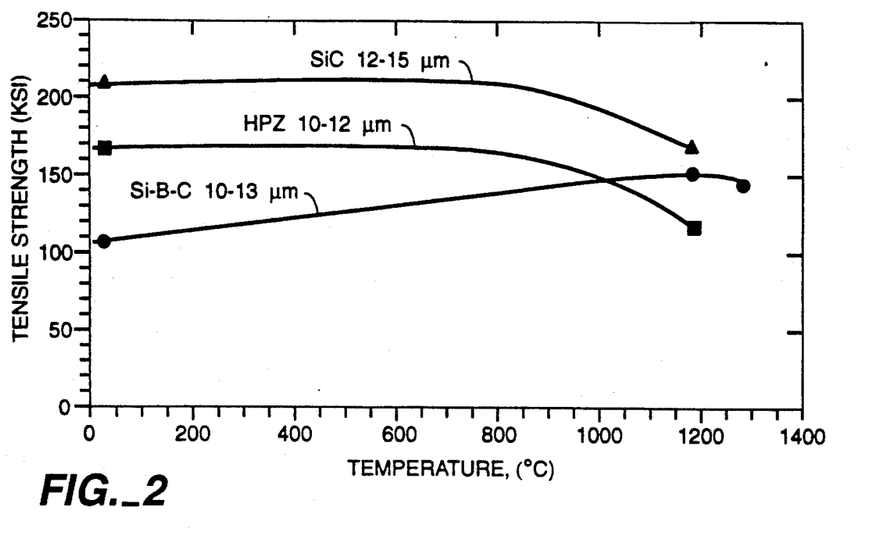
FIG. 2 depicts the tensile strength of silicon carbide (Nicalon), silicon-carbon-nitrogen (HPZ) and silicon-carbon-boron fibers as a function of temperature. The silicon-carbon-nitrogen fiber is commercially available from Dow-Corning Company, Midland, Mich. 48640.
Figure 3:
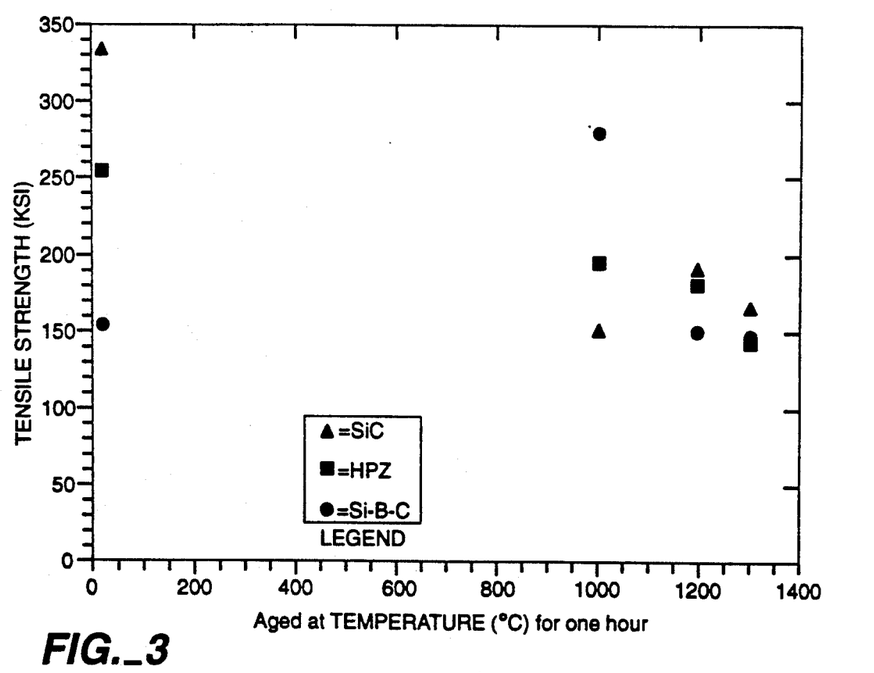
FIG. 3 is a graph of the tensile strength of fibers of Nicalon (Si—C), Si—B—C, and HPZ (Si—C—N) before and after aging at 1000°-1300° C. for 1 hr.

The same superiority of the ceramic fiber of the current invention can be seen in FIG. 2. FIG. 2 compares tensile strength of Nicalon fiber (—o—), Dow Corning HPZ fiber (—x—) and the silicon-boron-carbon of the current invention (—□—) and their performance based on different temperatures.

The tensile strength of all three fibers is measured at temperatures from room temperature (around 22° C.) to about 1200° C. The tensile strength of the 7 inch length Nicalon fiber (—o—) having a fiber diameter between 12 and 15 μm is around 210 KSI and continues in substantially the same manner until the temperature reaches 1200° C. at around 170 KSI. If this trend, as expected, would continue then the tensile strength of Nicalon would drop sharply down at any higher temperature than 1200° C. The similar pattern is seen with the decrease of tensile strength of HPZ fiber (siliconnitrogen) having a diameter between 10–12 μm. The HPZ fiber (—x—) has tensile strength of about 170 KSI which decreases slowly to about 150 KSI at 1000° C. and drops sharply to about 115 KSI at 1200° C. This drop in the tensile strength drops sharply and would be expected to continue to drop at temperatures higher than 1200° C. On the other hand, the silicon-boron-carbon fiber of the present invention (—□—) having a diameter of 10–13 μm has a lower tensile strength of about 100 KSI at room temperature and that strength was steady and increased to about 150 KSI up to temperatures of 1200° C. and beyond 1200° C.

Table 2 below is a comparison of the tensile properties of the UV/air cured ceramic fiber versus the hydrazine/UV cured ceramic fiber. As can be seen, the ceramic fiber derived from the hydrazine cured polymer has a higher strength than the ceramic fiber derived from the UV/air cure. The hydrazine/UV cured ceramic polymer is stronger.

TABLE 2

| | | Tensile Properties | |
|---|---|---|---|
| Sample No./Description | Diameter (μm) | Tensile Strength (ksi) | Tensile Modulus (msi) |
| 7/UV air cured | 10–13 | 149 | 22 |
| 8/N$_2$H$_4$ cured | 10–13 | 167 | 24 |
| 9/UV air cured | 15–18 | 150 | 22 |
| 10/N$_2$H$_4$ (UV) | 15–18 | 184 (240) | 26 |
| 11/N$_2$H$_4$ (UV) | 8–10 | 240 (290) | 22 |

Tensile strength is the average tensile strength of 5 or more samples.

Table 3 specifically shows the tensile properties of ceramic fibers measured at ambient temperature after aging at 1200°–1300° C. for 1 hr in air.

The primary advantage of the current novel ceramic fiber is that its tensile strength is substantially stable at any temperature between room temperature and particularly above 1200° C. to about 1300° C. Any product which utilizes the fiber of the current invention will ultimately be stable at such temperatures. Of course, the properties of any final product would also be dependent on the matrix material.

The advantages and utility of such stable products for space vehicles, materials used for insulations and other purposes are apparent.

The properties of the ceramic fiber of the current invention are thus superior to two other commercial fibers. The tensile strength of the silicon-boron-carbon is steady at temperatures from room temperature to and above 1200° C., while both Nicalon and HPZ fibers have tensile strength which drops constantly and substantially when exposed to temperatures above 1200° C.. Their utility due to such instability at higher temperatures is greatly limited.

For ceramic fibers intended to be used in extra demanding thermal conditions, it is very important that the performance of the fiber is steady and constant as seen with the fibers of the current invention.

In one embodiment, the ceramic fiber consists essentially of silicon, boron and carbon wherein the ratio 30-60% by weight of silicon, 2-8% by weight of boron and 18-40% by weight of carbon, and less than 20% by weight of oxygen.

TABLE 3

Tensile Properties of Commercial Ceramic Fibers At Ambient Temperature After High Temperature For One Hour In Air*

| Sample No./Description | Diameter (μm) | Tensile Strength (ksi) |
|---|---|---|
| 12/B-Si-C (Before aging) | 10-13 | 158 |
| 13/B-Si-C (1200° C. aging) | 10-13 | 156 |
| 14/B-Si-C (1300° C. aging) | 10-13 | 143 |
| 15/HPZ (before aging) | 10-12 | 257 |
| 16/HPZ (1200° C. aging) | 10-12 | 175 |
| 17/HPZ (1300° C. aging) | 10-12 | 138 |
| 18/SiC (before aging) | 12-15 | 334 |
| 19/SiC (1200° C. aging) | 12-15 | 186 |
| 20/SiC (1300° C. aging) | 12-14 | 158 |

*One inch sample measured at room temperature.

The composition, based on elemental analysis of the ceramic fibers of the air cured fiber is $SiB_{0.01-1}C_{0.5-2}O_{0.01-1}$.

The composition of the hydrazine cured sample is $SiB_{0.01-1}C_{0.5-2}N_{0.01-0.5}$.

UTILITY

Ceramic silicon-boron-carbon fibers of the current invention are stable in air at temperature from 20° C. to above 1200° C. and possess, at the same time, tensile strength in the 50-260 KSI range depending on the diameter of the fiber. Surprisingly, the tensile strength at 1200° to 1300° C. or higher temperatures is equal to the tensile strength measured at room temperatures. The new fibers are useful for manufacture of ceramic articles able to withstand high temperatures, such as those encountered, for example in aerospace, or in other extreme environmental conditions. The ceramic fibers are oxidation resistant, have excellent mechanical strength and can be advantageously used to strengthen or reinforce various insulation or construction materials.

The following Preparations (according to or adapted from U.S. Pat. Nos. 4,767,728 or 4,851,491) or Examples are provided to be illustrative and explanatory only. They are not to be construed as limiting the present invention in any way.

PREPARATION 1

Synthesis of Precursor Organic Polymer I

This preparation illustrates the synthesis of Polymer I using reaction between boron trichloride and dimethyldichlorosilane.

Sodium, 44 gram (1.91 mol), and 400 ml of dry octane were placed in a 1000 ml, 3-neck, round-bottom flask equipped with a magnetic stirrer, low-temperature (−30° C.) condenser, thermometer, dropping funnel, and nitrogen gas inlet. Nitrogen gas was allowed to flow through the system for at least 1 hr, and a slight positive pressure of nitrogen was maintained during the synthesis. The flask was heated to 130° C. One hundred ml of octane, 55.5 ml of dimethyldichlorosilane (0.45 mol), and 26.1 ml of boron trichloride (0.3 mol) were placed into the dropping funnel. The liquid in the dropping funnel was added to the heated flask dropwise over a period of 2-3 days at above 120° C. The reaction mixture was refluxed for 22 hours. Five-ml of methyl iodide or trimethylchlorosilane was added to the flask and continued to reflux for another 2 to 20 hours. After cooling, the reaction mixture was filtered in an inert atmosphere. The solvent of the filtrate was distilled at 125° C. in vacuum to yield a solid polymer I. The yield was 50-60%. Polymer I with less boron content (50-90%) was also synthesized.

PREPARATION 2

Synthesis of Precursor Organic Polymer II

This preparation illustrates the synthesis of polymer II using reaction between methyl boron dibromide and dimethyldichlorosilane.

Thirteen grams of sodium (0.565 mol) and 100 ml of dry octane were placed in a 500 ml, 3-neck flask equipped with a condenser, nitrogen-inlet tube, magnetic stirrer, and dropping funnel. The flask was heated to the reflux temperature of the solvent. Over a period of 4-8 hours, 17.4 grams of dimethyldichlorosilane (0.135 mol) and 25 grams of methyl boron dibromide (0.135 mol) in 50 ml of octane were added dropwise to the reaction flask through the dropping funnel. The reaction mixture was refluxed for 20 hours, and a purple-blue precipitate was formed. One-half ml of methyl iodide was added to the flask, and the reflux was continued for 2 hours. After cooling, the reaction product was filtered. The brown filtrate was distilled under reduced pressure to remove the solvent. A gummy polymer II was collected. Yield was 50-61%

PREPARATION 3

Synthesis of Precursor Organic Polymer III

This preparation illustrates synthesis of Polymer III (A) and Polymer III-0.5 (B) by reaction of boron trichloride, methyl iodide, and dimethyldichlorosilane.

A. Sodium, 44 grams (1.91 mol), and 400 ml of octane were placed in a 1000 ml, 3-necked, round-bottom flask equipped with a magnetic stirrer, low temperature circulated-liquid condenser, thermometer, dropping funnel, and nitrogen gas inlet. The flask was heated to 130° C. One hundred ml of octane, 37 ml of dimethyldichlorosilane (0.3 mol), 13.8 ml of methyl iodide (0.3 mol), and 26.1 ml of boron trichloride (0.3 mol) were placed into the dropping funnel. The liquid in the dropping funnel was added to the heated flask dropwise over a period of 8 to 20 hr at or above 120° C. The reaction mixture was refluxed for another 24 hr. After cooling, the reaction mixture was filtered. The filtrate was evaporated until dry and a vacuum was applied to remove the solvent at the end of the separation to yield a solid polymer III. Polymer III was soluble in toluene, chloroform, xylenes, alkane, and THF. The yield was 45-55%.

B. Polymer III-0.5 was synthesized similarly as above in Preparation 3A by reacting sodium (52 grams, 2.26 mol) in octane with dimethyldichlorosilane (0.5 mol), methyl iodine (0.25 mol), and boron trichloride (0.25 mol). A solid polymer III-0.5 with a 45-50% yield was isolated.

PREPARATION 4

Synthesis of Precursor Organic Polymer IV

This preparation illustrates synthesis of polymer IV (A) and IV-0.5 (B) by reaction of boron trichloride, methyl iodide, vinyl methyl dichlorosilane, and dimethyldichlorosilane.

A. Sodium, 72.5 grams (3.15 mol), and 900 ml of dry octane were placed in a 2000 ml, 3-necked, round-bottom flask equipped with a magnetic stirrer, low-temperature circulated-liquid condenser, thermometer, dropping funnel, and nitrogen gas inlet. The flask was heated to 125° C. The material in the dropping funnel (180 ml of octane, 54.6 ml of dimethyldichlorosilane (0.45 ml), 6.5 ml of vinyl methyl dichlorosilane (0.05 mol), 31 ml of methyl iodide (0.5 mol), and 43 ml of boron trichloride (0.5 mol)) was added to the heated flask dropwise over a period of 2 days at or above 122° C. The reaction mixture was refluxed overnight. Trimethylchlorosilane (5 ml) was added to terminate the reaction. After reflux for another day, the reaction mixture was cooled and the solution was filtered in an inert atmosphere. The filtrate was evaporated until dry to give a solid polymer IV. The yield was 45–55%.

B. To obtain polymer IV-0.5, the same procedure described in Preparation 4A was used as above, except less sodium (52 grams) methyl iodide (0.25 mol), and boron trichloride (0.25 mol) were used. The yield of precursor (green) of polymer IV-0.5 was 45–50%.

EXAMPLE 1

A Production of Monofilament Silicon-Boron-Carbon Precursor Fibers From Silicon-Boron-Carbon Precursor Organic Polymers This example illustrates the production of silicon-boron-carbon ceramic fibers of this invention from silicon-boron-carbon precursor polymers.

The precursor polymers I–IV were used as the starting material for preparation of black monofilament silicon-boron-carbon fibers. Monofilament green fibers were drawn from the spin-melt for the above listed polymers in Preparations 1–4.

The method for producing silicon-boron-carbon ceramic fiber comprises three steps: melt spinning, cross-linking, and pyrolysis.

Optional Prepurification to Remove Particles

Polymers I, II, III or IV obtained in Preparation 1, 2, 3 or 4 optionally are dissolved in sufficient octane (i.e. to produce a concentrated solution). The polymer containing octane solution was filtered through a 0.2 $\mu$m filter to remove any particles prior to drying.

A. Melt-Spinning Process

Monofilament continuous green precursor fiber having about 10 to 20 $\mu$m in diameter of polymer I was formed by a melt spinning process using an extrusion spinning device at about 120° to 200° C. using a 1 mm screw spinnerette and a filter screen of 5 to 20 $\mu$m at a speed of 100 meter/min. Polymer II, III, and IV are spin extruded up to about 200° C.

2. Cross-linking Process (Cure)

The monofilament green precursor fiber was then submitted to UV-light (2537 Å) irradiation in air for 24 hours in the presence of air.

3. Pyrolysis Process

The cross-linked precursor fibers were placed in an alumina boat and pyrolyzed in an inert atmosphere at temperature from ambient to 1300° C. at a heating rate of 10° C. per minute and held at 1300° C. for 20 minutes. The pyrolysis yielded a black ceramic fiber.

The resulting ceramic fiber was tested for its tensile properties at room temperature and at 1200° C. using high temperature tensile test described in Example 4. The results of ceramic fibers having various diameters are shown in Table 1.

In general, the tensile strengths of the ceramic fibers at a 1200° C. temperature or to 1300° C. are equal or higher than tensile strengths measured at room temperature.

Elemental analysis of the fibers produced by the process described in this Example shows the composition of the fiber is $Si_1B_{0.01-1}C_{0.5-2}O_{0.01-1}$.

Spinnerettes in the size of 0.1 to 1 mm were used. The precursor fibers were cured with UV irradiation in air for 48 hours. The cured fibers were then pyrolyzed in an inert atmosphere from room temperature to 1300° C. at a heating rate of 0.1 to 100° C./min and held at 1300° C. for 5 to 120 min.

EXAMPLE 2

Production of Monofilament Ceramic Fibers from Precursor Polymer I Using An Alternate Pyrolyzation Procedure This example illustrates a method of preparing ceramic fibers of the current invention using an alternate crosslinking and pyrolyzation procedure.

A. Spin-Melt

Polymer I was melt-spun at 160° C. using a mm spinnerette at a speed of 100 meter/minute to give thin fibers of diameter in the range of 20–30 $\mu$m according to the procedure described in Example 1.

B. Crosslinking

The obtained green precursor fibers were cured using UV (2537 Å) irradiation in air for 1 to 48 hr or thermal oxidation at ambient temperature for 1 to 6 days followed by gradual heating from room temperature to a temperature between 100°–150° C. at a heating rate of 0.1–10° C. per minute and held at 100°–150° C. for 1 day.

C. Pyrolysis

Crosslinked precursor fiber is pyrolyzed by an alternate procedure utilizing a high temperature alumina belt which passes through a furnace at 800°–1300° C. at a speed of 3 feet per hour and a heating rate of about 100° C. per minute.

The tensile strength of ceramic fibers utilizing the alternate pyrolyzation process was slightly better than that of the fibers pyrolyzed in the alumina boat as described in Example 1.

EXAMPLE 3

Crosslinking of the Organic Fibers by Hydrazine Cure Accelerated by UV Irradiation This example illustrates the preparation of silicon-boron-carbon precursor fiber by using a hydrazine cure in an inert atmosphere.

A. Spin-Melt

Polymer I was spin melted into a fiber as described in Example 1.

B. Crosslinking Using Hydrazine

Green precursor fibers from Polymer I obtained in Example 1 were exposed to concentrated hydrazine vapor under nitrogen or argon atmosphere for 16 hours and irradiated with UV (2537 Å) for 16 hours. The hydrazine/UV irradiation cure produced fibers having a high tensile strength.

C. Pyrolysis

Fibers cured with hydrazine/UV irradiation cure were submitted to pyrolysis at 800° to 1300° C. under the same conditions as described in Examples 1 and 2.

The hydrazine cured samples contained certain amount of nitrogen as determined by elemental analysis and also less oxygen than UV-air cured samples.

The detailed elemental analysis results show the composition of this ceramic fiber is $SiB_{0.01-1}C_{0.5-2}N_{0.01-0.5}$.

EXAMPLE 4

Measurement of Tensile Strength

High temperature tensile tests were conducted at 1200° C. as described in NASA Tech Briefs, pp. 44, November/December 1986.

While only a few embodiments of the invention have been shown and described herein, it will become apparent to those skilled in the art that various modifications and changes can be made in the novel process to produce a novel silicon-boron-carbon ceramic fibers or novel silicon-boron-carbonnitrogen fibers without departing from the spirit and scope of the present invention. All such modifications and changes coming within the scope of the appended claims are intended to be carried out thereby.

What is claimed is:

1. An improved ceramic fiber having structural stability between about 1200° to 1300° C. consisting essentially of silicon, boron and carbon, wherein the ratio of silicon to boron to carbon is from about: 30-60% by weight of silicon, 2-8% by weight of boron and 18-40% by weight of carbon, and less than 20% by weight of oxygen, which ceramic fiber is produced from an organic silicon-boron-carbon precursor polymer in the shape of a fiber.

2. An improved process for the production of a ceramic silicon-boron-carbon fiber comprising the steps:
   (a) melt-spinning a silicon-boron-carbon precursor organic polymer to produce a green precursor fiber having an exterior surface;
   (b) crosslinking the green precursor fiber of step (a) by curing and crosslinking the surface of the green precursor fiber using thermal air oxidation and ultraviolet light or hydrasine and ultraviolet light; and
   (c) pyrolyzing the crosslinked fiber of step (b) under conditions wherein the precursor crosslinked precursor does not melt or deform at elevated temperature to produce a ceramic fiber having the same shape as the crosslinked precursor fiber.

3. The process of claim 2 wherein the melt-spinning process of step (a) occurs using a 0.1–10 mm spinnerette at temperatures from 60°–250° C.

4. The process of claim 3 wherein in step (b) the crosslinking cure is by ultraviolet irradiation of 2500 to 3000 Å for 10 to 48 hours in the presence of air.

5. The process of claim 4 wherein in step (b) the ultraviolet irradiation is 2537 Å.

6. The process of claim 3 wherein in step (b) the crosslinking step is accomplished by thermal air oxidation by gradual heating in air to a temperature of 100° to 150° C. at a heating rate 0.01 to 20° C. per minute and simultaneously using ultraviolet radiation of 2537 Å for 10 to 48 hours.

7. The process of claim 6 wherein in step (c) the pyrolyzation of crosslinked precursor fiber is performed in an inert atmosphere at temperature from ambient to about 1300° C. at a heating rate of about 1° to 10° C. per minute and the temperature of the fiber is subsequently held at 800° to 1400° C. for 1 to 60 minutes.

8. The process of claim 7 wherein the temperature is held at 1300° C. for 20 minutes.

9. The process of claim 3 wherein in step (b) the crosslinking occurs using hydrazine vapor in an inert atmosphere for 8 to 24 hours and using simultaneous ultraviolet irradiation of 2537 Å for 8 to 24 hours.

10. The process of claim 9 wherein in step (c), the pyrolyzation of crosslinked precursor fiber is performed in an inert atmosphere at temperature from ambient to 1300° C. at a heating rate of about 1° to 10° C. per minute and the temperature is subsequently held at about 800° to 1400° C. for 1 to 60 minutes.

11. The process of claim 10 wherein the temperature is held at 1300° C. for 20 minutes.

12. The process of claim 11 wherein in step (c), the ultraviolet irradiation is 2537 Å.

13. The process of claim 5 wherein in step (c), the pyrolyzation of crosslinked precursor fiber is performed in an inert atmosphere at temperature from about ambient to 1300° C. at a heating rate of 1° to 10° C. per minute and the temperature is subsequently held at about 800° to 1400° C. for 1 to 60 minutes.

14. The process of claim 13 wherein the temperature is held at 1300° C. for about 20 minutes.

15. The process of claim 6 wherein in step (c), the pyrolyzation occurs by passing the crosslinked precursor fiber through a furnace at about 800° to 1400° C. at a speed of about 2 to 4 feet per hour at a heating rate of about 80° to 120° C.

16. An improved process for preparing a ceramic boron-silicon-carbon fiber, which process comprises:
   (A) obtaining a polyorganoborosilane ceramic precursor polymer consisting essentially of a plurality of repeating units of the formula:

(A)

the polymer unit being linked together by second units of the formula:

(D)

wherein R¹ is independently selected from hydrogen, lower alkyl, vinyl, cycloalkyl, phenyl or (E)

wherein R² and R³ are each independently selected from hydrogen, lower alkyl, vinyl, cycloalkyl, or phenyl; n is an integer between 1 and 100; p is an integer between 1 and 100; and q is an integer between 1 and 100, wherein the precursor polymer has a linear block, linear alternating, linear random structure, or a random three dimensional structure;

(B) melt spinning the precursor polymer of step (A) using a 0.1 to 10 mm spinnerette at a temperature of between 60° to 250° C. to produce a green precursor fiber having an exterior surface;

(C) crosslinking and curing the exterior surface of the green precursor fiber of step (B) using crosslinking conditions selected from;

(i) thermal air oxidation in the presence of ultraviolet light;

(ii) hydrazine in the presence of ultraviolet light;

(D) pyrolyzing the crosslinked precursor fiber of step (C) at temperatures in which the precursor fiber does not melt or deform at between 100° and 1300° C. using a heating rate of between about 1° to 100° C. per minute maintaining the pyrolyzed fiber at a temperature between about 1100° and 1300° C. for about 5 to 60 minutes; and (E) cooling the ceramic boron-silicon-carbon fiber or the ceramic boron-silicon-carbon-nitrogen fiber to ambient conditions.

17. The process of claim 16 wherein the polyorganoborosilane is obtained by a process which comprises:

(a') combining an organoborohalide of the formula: R⁴—B—(X¹)₂, and an organohalosilane of the formula: R²R³Si(X²)₂, with or without having R⁵X³ present as a component, wherein R⁴ is selected from halogen, lower alkyl, vinyl, cycloalkyl, or phenyl;

R⁵ is selected from lower alkyl, vinyl, cycloalkyl or phenyl;

R² and R³ are each independently selected from hydrogen, lower alkyl, vinyl, cycloalkyl, aryl, or substituted aryl; and

X¹, X² and X³ are each independently selected from chloro, bromo or iodo, in an anhydrous aprotic solvent having a boiling point at ambient pressure of not greater than 160° C., with at least four equivalents of a alkali metal;

(b') heating the combination of step (a') for a time and at a temperature up to about 160° C. effective to produce a polyorganoborosilane; and

(c') recovering the polyorganoborosilane produced in step (b') which consists essentially of a plurality of repeating units of the formula:

(A)

the polymer unit being linked together by second units of the formula:

(D)

wherein R¹ is lower alkyl, vinyl, cycloalkyl, phenyl, or (E)

wherein R² and R³ are each independently selected from halogen, lower alkyl, vinyl, cycloalkyl, or phenyl; r is an integer between 1 and 100; p is an integer between 1 and 100; and q is an integer between 1 and 100 wherein the polymer has a linear block, linear alternating, linear random structure or a random three dimensional structure.

18. The process of claim 17 wherein in step (a') R⁵X³ is present and R⁵ is lower alkyl.

19. The process of claim 18 wherein lower alkyl is methyl and X³ is iodo.

20. The process of claim 17 wherein in step (c') the polyorganoborosilane is independently selected from:

Polymer I: $(Si)_n Me_2$—$(B)_m SiMe_2$ wherein n and m are $\geq 1$;

Polymer II: $(Si)_n Me_2$—$(B)_m$—$CH_3$ wherein n and m are $\geq 1$;

Polymer III: $(Si)_n Me_2$—$(B)_m$—$CH_3$ wherein n and m are $\geq 1$; or

Polymer IV: $(Si)_{0.9n} Me_2$—$(Si)_{0.1n} Me(CH_2CH_3)$—$(B)_m Me$ wherein n is equal to m or n is 2 m.

21. An improved ceramic fiber consisting essentially of silicon-boron-carbon produced by the process of claim 2.

22. The ceramic boron-silicon-carbon fiber produced by the process of claim 16.

23. The ceramic boron-silicon-boron fiber produced by the process of claim 17.

* * * * *